US009235698B2

(12) United States Patent  (10) Patent No.: US 9,235,698 B2
Webber et al.  (45) Date of Patent: Jan. 12, 2016

(54) DATA ENCRYPTION AND SMARTCARD STORING ENCRYPTED DATA

(71) Applicant: CYLON GLOBAL TECHNOLOGY INC., Nassau, New Providence (BS)

(72) Inventors: Glenn Webber, New Providence (BS); Eamonn Courtney, New Providence (BS); Jacqueline Cole-Courtney, New Providence (BS)

(73) Assignee: Cylon Global Technology Inc., Nassau (BS)

( * ) Notice: Subject to any disclaimer, the term of this patent is extended or adjusted under 35 U.S.C. 154(b) by 0 days.

(21) Appl. No.: 14/261,993

(22) Filed: Apr. 25, 2014

(65) Prior Publication Data

US 2015/0067348 A1  Mar. 5, 2015

(30) Foreign Application Priority Data

Aug. 30, 2013 (GB) .................................. 1315572.6

(51) Int. Cl.
*G06F 21/32* (2013.01)
*G06F 21/62* (2013.01)
*G06F 21/60* (2013.01)

(52) U.S. Cl.
CPC .............. *G06F 21/32* (2013.01); *G06F 21/602* (2013.01); *G06F 21/6209* (2013.01)

(58) Field of Classification Search
CPC  G06F 21/32; G07C 9/00087; G07C 9/00158; G06Q 20/40
See application file for complete search history.

(56) References Cited

U.S. PATENT DOCUMENTS

| 4,582,985 | A  | 4/1986  | Lofberg       |
|-----------|----|---------|---------------|
| 5,623,552 | A  | 4/1997  | Lane          |
| 5,912,453 | A  | 6/1999  | Gungl et al.  |
| 6,012,636 | A  | 1/2000  | Smith         |
| 6,182,892 | B1 | 2/2001  | Angelo et al. |
| 6,325,285 | B1 | 12/2001 | Baratelli     |

(Continued)

FOREIGN PATENT DOCUMENTS

| CN | 1403996 | 3/2003 |
|----|---------|--------|
| CN | 2562256 | 7/2003 |

(Continued)

OTHER PUBLICATIONS

Combined Search and Examination Report under Sections 17 and 18(3) dated Feb. 3, 2014, for United Kingdom Patent Application No. GB1315572.6, filed Aug. 30, 2013.

*Primary Examiner* — Chau Le
*Assistant Examiner* — Ghodrat Jamshidi
(74) *Attorney, Agent, or Firm* — Knobbe, Martens, Olson & Bear, LLP (57) ABSTRACT

A data encryption and decryption process, particularly for use in smart cards, in which the data is encrypted using an encryption key derived from a fingerprint template. The fingerprint template is stored, in unencrypted form, in a memory which, apart from the fingerprint template, is filled or substantially filled with random data values thereby to conceal the fingerprint template. The template may be broken up into components stored in disparate locations in the memory to further increase security. Decryption is performed by, firstly, carrying out scanning a fingerprint to obtain a new template, comparing the new template with the previously stored template and, if there is a match, regenerating the encryption key from the previously stored template. The regenerated encryption key is then used to decrypt the data.

16 Claims, 3 Drawing Sheets

(56) References Cited

U.S. PATENT DOCUMENTS

| | | |
|---|---|---|
| 7,028,893 B2 | 4/2006 | Goodman et al. |
| 7,044,368 B1 | 5/2006 | Barron |
| 7,269,277 B2 | 9/2007 | Davida et al. |
| 7,278,025 B2 | 10/2007 | Saito et al. |
| 7,506,806 B2 | 3/2009 | Bonalle et al. |
| 7,711,152 B1 | 5/2010 | Davida et al. |
| 7,715,593 B1 | 5/2010 | Adams et al. |
| 7,819,329 B2 | 10/2010 | Lu et al. |
| 7,841,539 B2 | 11/2010 | Hewton |
| 8,052,052 B1 | 11/2011 | Power |
| 2003/0223624 A1 | 12/2003 | Hamid |
| 2003/0226041 A1 | 12/2003 | Palmer et al. |
| 2005/0044387 A1 | 2/2005 | Ozolins |
| 2005/0194452 A1 | 9/2005 | Nordentoft et al. |
| 2005/0240778 A1 | 10/2005 | Saito |
| 2006/0032905 A1 | 2/2006 | Bear et al. |
| 2006/0091223 A1 | 5/2006 | Zellner et al. |
| 2006/0213973 A1 | 9/2006 | Chan et al. |
| 2007/0189581 A1 | 8/2007 | Nordentoft et al. |
| 2008/0019573 A1* | 1/2008 | Baltatu et al. ............... 382/115 |
| 2008/0072063 A1 | 3/2008 | Takahashi et al. |
| 2008/0126260 A1 | 5/2008 | Cox et al. |
| 2008/0223925 A1 | 9/2008 | Saito et al. |
| 2008/0265017 A1 | 10/2008 | West |
| 2009/0153297 A1 | 6/2009 | Gardner |
| 2009/0210722 A1* | 8/2009 | Russo ........................ 713/189 |
| 2011/0102141 A1 | 5/2011 | Wu |
| 2011/0119182 A1 | 5/2011 | Smolkin |
| 2011/0175702 A1 | 7/2011 | Desnoyers |
| 2011/0240748 A1 | 10/2011 | Doughty et al. |
| 2011/0264919 A1* | 10/2011 | Pizano et al. ................ 713/186 |
| 2011/0295748 A1 | 12/2011 | Woodriffe |
| 2012/0042369 A1 | 2/2012 | Fan |
| 2012/0049309 A1 | 3/2012 | Kiyomoto et al. |
| 2012/0088449 A1 | 4/2012 | Norair |
| 2013/0046693 A1* | 2/2013 | Ayedun et al. ................. 705/44 |
| 2013/0065564 A1* | 3/2013 | Conner et al. ............. 455/414.1 |

FOREIGN PATENT DOCUMENTS

| | | |
|---|---|---|
| CN | 102222389 | 10/2011 |
| EP | 1071049 | 1/2001 |
| EP | 1204079 | 5/2002 |
| EP | 1326196 | 7/2003 |
| GB | 2243235 | 10/1991 |
| JP | 07250111 | 9/1995 |
| JP | 2002222407 | 8/2002 |
| JP | 2003162705 | 6/2003 |
| KR | 1020060033418 | 4/2006 |
| WO | WO2009055303 | 4/2009 |
| WO | WO 2009/070339 A1 | 6/2009 |

* cited by examiner

DATA ENCRYPTION AND SMARTCARD STORING ENCRYPTED DATA

FIELD OF THE INVENTION

This invention relates to data encryption methods and apparatus and to smart cards which may encrypt and store data thereon.

BACKGROUND

Numerous data encryption methods have already been proposed in which the data to be encrypted (which will be referred to as the input data) is processed by an electronic data processor, or computer, which executes an encryption algorithm utilising an encryption key. Decryption of the encrypted data may be achieved by processing the encrypted data by the same or a different electronic data processor or computer which executes a decryption algorithm that may utilise the same key as used for encryption. The security of the encrypted data is dependent upon both the nature of the algorithms and the keys and the level of security applied to the storage of them.

With a view to providing a secure encryption key, it has been proposed to derive the key from a fingerprint template of an individual. The process involves electronically scanning a finger to derive raw data representing the fingerprint, processing the raw data to derive a fingerprint template, which (as is known) is based upon the minutiae of the fingerprint, processing the fingerprint template to derive an encryption key and processing the input data as described above utilising the encryption key derived from the fingerprint template. After the input data has been encrypted, the encryption key is discarded i.e. not stored so that it is difficult or impossible to decrypt the encrypted data without regenerating the encryption key. Decryption of the data thus requires re-generation of the encryption key by again scanning the same finger to derive a fingerprint template from it and processing the fingerprint template in the same manner as previously to obtain a re-generated encryption key.

A problem with this proposal is that, when the finger is re-scanned, the raw fingerprint data obtained will differ slightly from that obtained in any previous scan. This is because it is almost impossible to ensure that the finger is applied to the scanner with the same pressure each time or in precisely the same position, or it may be that the skin of the finger suffers damage from time to time so that sometimes when the finger is scanned there will be no damage and at other times there will be damage, and of course the damage, if any, may be different each time the fingerprint is scanned. As a consequence, each new fingerprint template obtained will slightly differ from previous ones. To reduce these differences, it is known to scan the finger several times to obtain a corresponding number of templates and then take the average of those to form an averaged fingerprint template. The averaged fingerprint template may then be stored for use in a fingerprint verification process in the future.

In such a future verification process, an averaged fingerprint template would again be obtained and compared with the previously stored averaged fingerprint template. Although, for the reasons explained above, there will still be differences between the averaged fingerprint templates, these differences are not sufficient to negate the verification process. However, those differences make it impossible to produce, from the newly derived fingerprint template, a re-generated encryption key which would be identical to the encryption key derived from the previously obtained averaged fingerprint template.

The present invention addresses this problem.

SUMMARY OF THE INVENTION

In one aspect, the invention provides an electronic process for encrypting and decrypting information in electronic form as defined in claim 8.

In another aspect, the invention provides a smartcard which incorporates a fingerprint reader and is operable to perform an encryption and decryption process, as defined in claim 1. The smartcard may be operable for a variety of different functions or purposes, in which stored data relating to the different functions is encrypted utilising encryption keys derived from different fingers of an individual or fingers of different individuals.

The following detailed description of an embodiment of the invention explains how the above problem is solved.

DETAILED DESCRIPTION OF EMBODIMENT

The invention is described further by way of example with reference to the accompanying drawings, in which.

OVERVIEW

Figure 1:
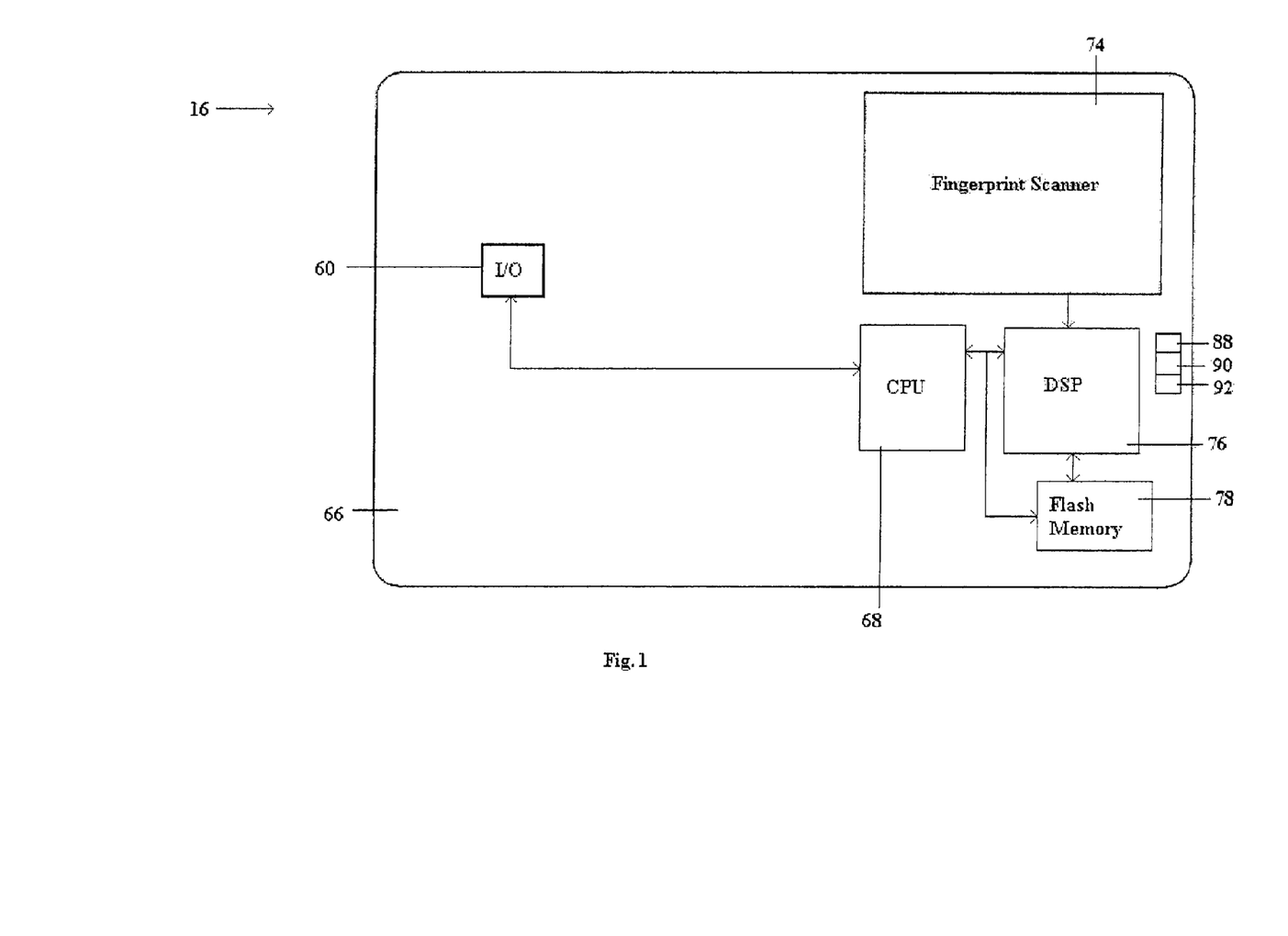
FIG. 1 is a block diagram of the main components of a smartcard incorporating a fingerprint reader, in accordance with an embodiment of the invention.

FIG. 1 shows a smartcard 16 for the performance, or authorisation, of any of a multiplicity of electronic processes or transactions in cooperation with an appropriate card reader. Unlike conventional smart cards however, the respective electronic transaction will not be performed or authorised unless a successful fingerprint verification process takes place, as will be more fully described later.

The electronic transactions may be of different types, including transactions providing access to buildings or areas by electronically controlled gates or barriers, transactions providing access to physical storage locations or rooms, transactions providing access to electronically stored data and transactions for turning on or off any kind of electrical or electrically controlled apparatus, machinery or system, financial transactions, or simply identification processes. The expression "electronic transactions" is therefore used broadly herein and includes any electronic or computer implemented event or process, particularly any event or process that may be initiated by, or controlled by or authorised by, an individual.

Apart from the fact that the card 16 is provided with means (to be described later) for the performance of the fingerprint verification process, it is preferably otherwise constructed in accordance with the appropriate ISO/IEC standards for smart cards, and comprises a substrate of specific structure and dimensions according to the standard, an integrated circuit comprising a microprocessor and appropriate memory storing data and programs, a circuit and contacts for connecting the card to a card reader such as a point-of-sale terminal (POS) or automated teller machine (ATM), a magnetic stripe storing data, and embossed and/or other alphanumeric characters identifying the person to whom the card is registered and the associated bank or other account. Instead of or in addition to electrical contacts, the card might be provided with means for wireless communication with a POS or ATM, particularly in accordance with relevant ISO/IEC standards.

Thus, in use, the smart card 16 may be inserted into, or otherwise cooperate with, a card reader device (not shown), for example a POS in a store or restaurant for purchasing goods or an ATM for dispensing cash. As is conventional, the card reader device may be arranged to require input, typically by a keyboard, of the correct personal identity number (PIN) before a transaction can be processed. Processing to check the PIN may be performed in a conventional manner by the processor incorporated into the smart card 16 or by a processor included in the POS or ATM.

Thus, the card 16 also stores, as is conventional an appropriate PIN. However, contrary to conventional smart cards, the card 16 may store a number of different PINs, each for use in a respective different function of the card.

Overview of Smartcard

As shown in FIG. 1, the smartcard device 16 comprises a rectangular substrate 66, in the form of a card, upon which are mounted a fingerprint scanner 74 of conventional construction, a digital signal processor 76, a flash memory unit 78, a CPU 68 and an I/O interface 60.

The substrate 66 also supports three light sources, preferably light emitting diodes (LEDs), 88, 90 and 92 for indicating respectively three different statuses of the device. Thus, LED 88 may be illuminated to indicate that a process requiring the reading of the fingerprint is to take place and the user of the card should therefore place his/her appropriate finger on the fingerprint scanner 74. The LED 90 may be illuminated to indicate that the process has been successful and the LED 92 may be illuminated to indicate that the process has been unsuccessful. Preferably, the LEDs 88, 90 and 92 are of different colours, which are preferably blue, green and red respectively.

The substrate 66 and the components 68 to 92 mounted on it are preferably constructed and arranged so that the dimensions and shape of the card 16 as a whole are such that it can be readily carried in a wallet along with, or instead of, conventional credit cards. Preferably, the dimensions and shape are as close as practicable to the size and shape of a conventional credit card. By way of example, the dimensions of the card 16 (i.e. the substrate 66 together with the components 68 to 92) may be approximately, for example, 85 mm×54 mm×1 mm (at an end inserted into a card reader) or 2.5 mm (at an end comprising most of the components of the card 16). Other dimensions are possible. To achieve these dimensions, all of the components supported on the substrate may be constructed to be as flat (thin) as possible or practicable i.e. the dimensions of each component in a direction normal to the plane of the substrate 66 should be as small as possible or practicable and they should be positioned and arranged on the substrate 66 so as to achieve the required overall thickness of the card 16. Alternatively, the, or some of the, components may sit within cutouts of the substrate 66 in order to lower the profile of the components.

The substrate may be constructed of material conventionally used for credit cards and the like, for example a suitable synthetic plastics material.

The I/O interface 60 may be a conventional smart card contact interface or a contactless interface in accordance with the relevant ISO/IEC standards.

CPU

Figure 2:
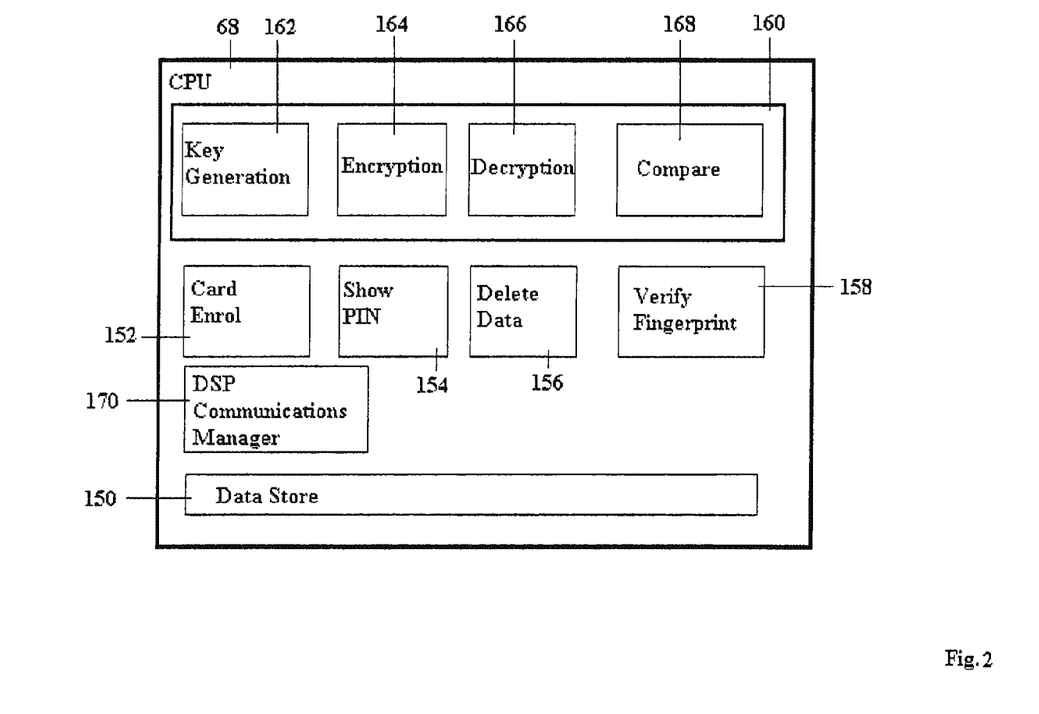
FIG. 2 is a block diagram showing the main components, as relevant to this embodiment, of a CPU provided on the card of FIG. 1.

The CPU 68, which is shown in more detail in FIG. 2, may be of the type conventionally used in smart cards but modified to include additional functionality to enable the CPU 68, fingerprint scanner 74 and DSP 76 to execute the processes required in this embodiment of the invention. Alternatively, it can be of a different type such as a PIC Chip (Trade Mark).

To provide the functionality required by this embodiment of the invention, the CPU 68 is configured to provide a data store 150 (illustrated in detail in FIG. 3) for storing data relating to a user of the card 16, a set of control modules 152, 154, 156 and 158 each for responding to a respective one of different commands received by the CPU 68 from a card reader, and an encrypted data handler 160.

The encrypted data handler 160 comprises an encryption key generator 162 for generating encryption keys in a manner which will be described later, an encryptor 164 for encrypting data using those keys, a decryptor 166 for decrypting the data so encrypted and a comparator 168 for performing comparison operations on encrypted data as will be described later.

A DSP communications manager 170 controls communication between the CPU 68, the digital signal processor 76 and the flash memory 78.

CPU Data Store and Flash Memory

Figure 3:
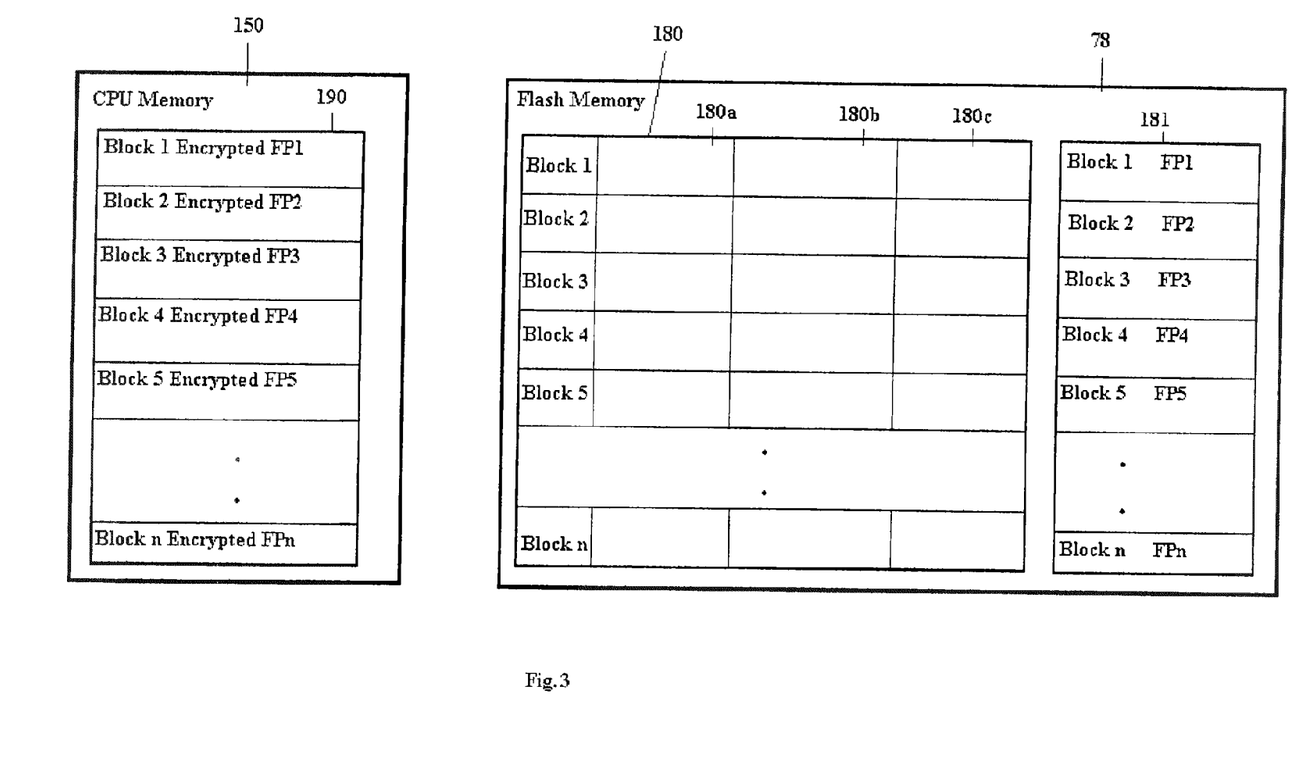
FIG. 3 is a block diagram showing the contents of a data store included in the CPU of FIG. 2 and of a flash memory provided on the card shown in FIG. 1.

With Reference to FIG. 3, the data store 150 comprises an encrypted fingerprint register 190 which is divided into a number of different blocks which are labelled as Blocks 1 to n so as to indicate correspondence between blocks which are similarly labelled in flash memory 78 and the blocks in register 190. Each of the Blocks 1 to n in register 190 is for containing a respective different encrypted fingerprint template, each of which is to be used in a verification process and each of which may be used for decrypting data from the corresponding block in flash memory partition 180.

In general, a card 16 will be registered to a single user and accordingly the encrypted fingerprint register 190 may be configured for storing up to 10 encrypted fingerprint templates, one for each finger/thumb, so that different fingers/thumbs can be used for obtaining data from the respective different block in flash memory partition 180. In cases in which more than 10 data blocks are required in flash memory partition 180, one or more of the blocks in encrypted fingerprint register 190 may each correspond to two or more data blocks in the flash memory partition 180.

The flash memory 78 also includes a partition 181 for storing unencrypted fingerprint templates generated by the DSP 76 from data received from the fingerprint scanner 74, which is also of conventional construction. The unencrypted fingerprint templates are stored in the memory partition 181 in locations which are also indicated in FIG. 3 as Blocks 1 to n so as to represent correspondence with the Blocks 1 to n of the encrypted fingerprint register 190. The remainder of the flash memory 78 is filled with, or at least partly filled with, "dummy" bytes of data so that it would be impossible, or at least difficult, to determine from a readout of the contents of the flash memory which data represents the unencrypted fingerprint templates. The values of the "dummy bytes" may be generated by a random number generator. In practice, the memory partition 181 may be completely populated with dummy bytes when formatted prior to use, in which case the dummy bytes would be overwritten in memory locations in which fingerprint templates are stored.

To increase the difficulty in locating the fingerprint templates from a readout of the contents of the memory, Blocks 1 to n in the memory partition 181 may be in disparate memory locations and the capacity of the flash memory 78 may be substantially greater than that needed for the storage of the data in partition 180 and unencrypted fingerprint templates in partition 181.

Further, although, for simplicity, each Block in memory partition 181 has been drawn as if the bytes representing each respective fingerprint template are stored in a continuous block of memory locations i.e. in sequential memory positions, this is not essential. For example, for added security each fingerprint template may be broken up into a number of smaller components and the smaller components stored in disparate memory locations.

By way of numerical example, memory partition 181 may have a capacity of 64 kilobytes and each fingerprint template may be made up of 1000 bytes. In light of the above explanation, the 1000 bytes that make up a given fingerprint template may be stored in sequential memory locations or alternatively may be broken up into a number of components and the components stored at disparate memory locations. For example, each component may consist of a single byte in which case the template would be stored in 1000 disparate one byte memory locations. Alternatively, each component may consist of two or more bytes, and all of the components may be made up of the same number of bytes or different components could be made up of different numbers of bytes.

Each of the Blocks 1 to n of partition 180 is for storing data related to a respective different type of transaction that may be initiated or authorised by the card. By way of example the data in Blocks1 to 5 may relate respectively to transactions by a particular bank, American Express transactions, Visa transactions, transactions in a particular loyalty scheme and pension benefits transactions. Other Blocks in partition 180 might store, for example, information relating to the user's passport, driving licence, or access to buildings, secure locations, or documents stored in a computer system. In this embodiment, therefore, each of the data Blocks 1 to n in flash memory partition 180 corresponds to a respective different one of the transactional entities or, expressed differently, corresponds to a respective different service or type of transaction with which the card 16 may be used.

Each of the Blocks 1 to n in flash memory partition 180 has a field 180a for storing the PIN of a user for a respective transactional entity. The PINs may all be the same as each other or may all be different from each other. Alternatively, some of the pins may be the same as each other and others different. Thus, there may be for example a financial transaction PIN, a PIN providing access to buildings or areas by electronically controlled gates or barriers, transactions providing access to physical storage locations or rooms, a PIN providing access to electronically stored data and PIN for turning on or off any kind of electrical or electrically controlled apparatus, machinery or system. The expression "PIN" is used broadly herein and includes any suitable code.

In addition, each of Blocks 1 to n in the flash memory partition 180 has memory areas 180b and 180c, which may be of variable size, for storing further data which might be required by different services or organisations, or in relation to different types of transactions or in cases where particular transactional entities might be set up to require additional data to be returned following a successful fingerprint verification process. Such data may be account number, sort code, expiry dates, security number, date of birth, address, driving license number, other type of licence number, passport number, visa number, visa conditions, electoral number, national insurance number, benefits number, credit rating, insurance policy, medical alert details, and the user's membership number in an organisation to which the user belongs and to which a proposed transaction relates. Such an organisation might be a professional body, a club or a customer loyalty scheme.

Some or all of the data in the flash memory partition 180 may be encrypted.

Card Functionality

The function of each card 16 is to receive commands, to execute the received command and, when required, to send data to the card reader.

There may be four such commands, each of which may be represented by a Hex code, as follows:

| "enrol user" | Hex Code = | "0xA1 0x01 0x0n" |
|---|---|---|
| "identify user" | Hex Code = | "0xA1 0x02" |
| "show PIN" | Hex Code = | "0xA1 0x03" |
| "remove user" | Hex Code = | "0xA1 0x04 0x0n" | where "n" in the component 0x0n of the Hex code has a value between 1 and n, to correspond with the Blocks 1 to n shown in FIG. 3.

In the above commands, the first component of each Hex code, namely 0x0A1, is the address of the DSP 76.

In the enrol command, the second component of the Hex code, namely 0x01, instructs the DSP 76 to perform an enrolment process. A separate enrolment process will be performed for each different function for which the card is to be used. In the first enrolment process which is performed, the third component of the Hex code in the enrolment command will have a value 0x01, which instructs the DSP 76 to use the address Block 1 in partition 181 to store a fingerprint template produced in the first enrolment process. In each successive enrolment process the value of the third component of the Hex code in the enrolment command will be 0x02, 0x03 etc. respectively, thereby instructing DSP 76 to store each successive fingerprint template in the corresponding block of memory partition 181.

The second component "0x02" of the Hex code of the identify user command instructs the DSP 76 to perform a fingerprint verification process.

The second component "0x03" of the Hex code of the show PIN command instructs the DSP 76 to make the appropriate PIN available for processing following a successful fingerprint verification process, so that the PIN stored in the card can be checked against a pin entered manually into the card reader.

The second component"0x04" of the remove user command instructs the DSP 76 to delete the data and fingerprint templates in the Blocks identified by the value "n" of the third component of the remove user command.

It will be understood that the above Hex codes are merely by way of example and any suitable form of coding for the commands can be used.

Thus, a number of different sets of data may be stored on the card during an enrol process, for example each set being related to a respective different matter or item, such as a different credit, bank or other card or a different vendor or institution. Thus, a single card 16 registered to a single individual may be set up for verifying the identity of the individual in connection with a number of different transactions such as those described above.

Enrolment Process

The enrolment process may be initiated by an institution, such as a bank, in relation to which the verification is to be used, for which purpose an enrolment command would be sent to the card electronically, for example via a card reader.

In response to receiving, by CPU 68, an enrolment command, the card enrol module 152 of the CPU is called into operation. This causes the LED 88 (preferably blue) to be energised and causes the DSP communications manager 170 to send a command to the DSP 76 to initiate a fingerprint reading operation utilising the fingerprint scanner 74.

The DSP 76 is a conventional integrated circuit chip programmed in a conventional manner for deriving fingerprint templates from the data provided by the scanner 74 and storing the resulting templates in the flash memory 78. As already explained, a fingerprint template is a set of digital data representing or derived from the minutiae in fingerprints in such a way as to uniquely or substantially uniquely represent the fingerprint in a dataset of modest size. In practice, each template which is stored is based upon an average of a number of scans of the same finger, for example three scans. The DSP 76 and fingerprint scanner 74 are arranged to function accordingly and, thus, following detection in a conventional manner of a finger placed upon the fingerprint scanner 74, the scanner 74 performs the required number of scans and the DSP 76 computes an averaged fingerprint template and stores it in the flash memory 78. Assuming that this is the first enrolment, for simplicity of description it will be assumed that this fingerprint template is stored in Block 1 in partition 181 of the flash memory as unencrypted fingerprint template FP 1.

The card enrol module 152 thereafter calls into operation the encryption key generator 162 which derives an encryption key from the unencrypted fingerprint template FP 1. The algorithm for generating the encryption key may be any suitable known algorithm. Using the encryption key so derived, the encryptor 164 encrypts the averaged fingerprint template FP 1 and stores the result in Block 1 of the encrypted fingerprint register 190. The encryption algorithm executed by encryptor 164 may be any suitable known encryption algorithm.

Additionally, the card enrol module 152 identifies the Block of flash memory partition 180 into which the data relating to the transactional entity from which the enrol command is received, is to be stored. However, before storing that data if the data to be stored in flash memory partition 180 is to be encrypted, the card enrol module 152 calls into operation the encryptor 164 to use the encryption key derived above from the stored averaged fingerprint template in the flash memory 78 for the purpose of encrypting the data with the same encryption algorithm as referred to above.

Following successful completion of the enrolment process, the card enrolment module 152 causes the green LED 90 to be illuminated. If the enrolment process was unsuccessful the red LED 92 will be illuminated and the process can be initiated again. If several attempts at enrolment fail, then the operator of the system may investigate the cause of the error.

Subsequent enrolment processes for enrolling the same card 16 for the performance of authentication processes for different transactional entities are performed in a similar manner. However, the user may select a different finger for each successive enrolment process and the data derived from each successive process is stored in each successive Block respectively in the flash memory 78, the encrypted fingerprint register 190 and the flash memory partition 180.

Hence, the user of the card 16 may use a different finger/thumb for the verification processes performed by the different transactional entities, as already mentioned.

Verification Process

Following enrolment, the card 16 may be used in a verification process for verifying the identity of the individual requesting the relevant transaction.

In response to the CPU 68 receiving either an identify user command or a show PIN command from a card reader, the verify fingerprint module 156 is called into operation. The verify fingerprint module 156 causes the blue LED 88 to be illuminated to indicate to the user that the card 16 is about to perform a fingerprint reading process. The person requesting the transaction will know which transaction he is requesting and, if he is also the person to whom the card 16 is registered, he will know which finger he presented to the fingerprint scanner 74 when enrolling the device in respect of each of the relevant transactions. Thus, upon illumination of the blue LED 88, the user of the card 16 will, if he/she is the person requesting the transaction, place the appropriate finger or thumb on the fingerprint scanner 74.

In response to this, and an appropriate command from the verify fingerprint module 156, the DSP 76 will derive an averaged fingerprint template, using the same process as described previously.

As already explained, it is unlikely that any two scans of the same fingerprint by a fingerprint reader will produce identical fingerprint data, for example because the user may apply different pressure through his finger thereby distorting the shape of his finger differently, the angle at which his finger is positioned may differ or there may be damage to the skin of his finger that was or was not present for both of the scans. As a consequence, it is unlikely that any two fingerprint templates derived from the same finger will be the same or that any two averaged fingerprint templates derived from the same finger will be the same. However, the averaged fingerprint templates will be sufficiently similar to enable the newly derived averaged fingerprint template to be matched to the fingerprint template stored in the flash memory 78 in the enrolment process.

Accordingly, in a conventional manner, the DSP 76 searches the flash memory 78 for a match to the newly derived averaged fingerprint template. In so doing, the DSP 76 may limit its search to the specific address locations in partition 181 in which fingerprint templates have been stored in the enrolment processes. Alternatively, this search may be conducted through the whole of partition 181 or the whole of the flash memory. In embodiments in which, as previously described, each fingerprint template is broken up into components which are stored in disparate locations, the DSP 76 may reassemble each template from its components in order to enable matching process to take place, or alternatively it may compare the newly derived averaged fingerprint template component by component with the components of each previously stored template until a match is found.

If the search does not find a match, DSP 76 sends a signal indicating this to the CPU 68 and the verify fingerprint module terminates the process at that point. As a result the verification process has failed. In those circumstances the transaction may not be authorised.

If the DSP 76 finds a match between the newly derived averaged fingerprint template and a previously stored template in the flash memory 78, the DSP 76 sends a message indicating this to the CPU 68, in response to which the CPU 68 may initiate a decryption process as described below.

The CPU 68 is arranged so as not to save the encryption key derived from the averaged fingerprint template in the enrolment process, for security reasons. Consequently it is necessary to derive a new and identical encryption key in order to decrypt the data in the flash memory partition 180. Whilst the newly derived averaged fingerprint template is sufficiently similar to the previously stored fingerprint template in the flash memory 78 to enable matching to take place for the purpose of verifying the fingerprint, it is not sufficiently similar to enable an identical encryption key to be derived.

Thus, in the present embodiment, the previously stored fingerprint template in flash memory 78 which has been found to match the newly derived averaged fingerprint template is accessed by the verify fingerprint module 156 which then causes the key generator 162 to generate a new encryption key derived from the previously stored fingerprint template in the flash memory 78. Since this is the same as the fingerprint template used to derive the encryption key in the enrolment process, the newly derived encryption key will be identical and is used by the decryptor 166 to decrypt the PIN stored in the relevant block 1 to n of flash memory partition 180 so that the decrypted PIN may be provided to the show PIN module 154.

However, before carrying out this process and as a double security check, the previously stored fingerprint template is also encrypted with the newly derived encryption key and, utilising compare module 168, it is compared with encrypted fingerprint templates stored in the Blocks 1 to n of the encrypted template register 190, to determine if a match can be found.

As an alternative to this process, the newly derived encryption key may be used to decrypt the encrypted fingerprint template in the appropriate block in register 190 and the comparator 168 used to compare this decrypted fingerprint template with the averaged fingerprint template which is stored in flash memory 78 and has been identified by the DSP 76 during the verification process.

In either case, if the comparator 168 does not find a match in the encrypted fingerprint register 190, the verification process is terminated and the red LED 92 illuminated to indicate failure of the verification process. As a result, the verification process has failed and the card may be locked.

If the comparator 168 does find a match, the green LED 90 is illuminated to indicate this and, if the command input to the card from the card reader was a show PIN command the show pin module 154 is called into operation to make the relevant PIN stored on the card available for processing within the card reader or within the card 16 for PIN verification in a conventional manner utilising a PIN entered into the card reader.

In order to make the PIN stored on the card available for the PIN verification process, the show PIN module 154 calls into operation the decryptor 166 to decrypt the PIN from the block 1 to n in the flash memory partition field 180a that corresponds to the fingerprint template stored in flash memory 78 which was used to verify a user. The decryptor 166 uses a decryption algorithm discussed above with the encryption key derived from the fingerprint template stored in flash memory 78 which was derived during the above verification process and provides the decrypted PIN to a card reader for processing or to the card 16 for processing of the conventional PIN verification.

An alternative way in which the PIN could be made available would be for the card reader first to send an identify user command to the card, in response to which the card would perform the verification process and if this is successful, the card would send a signal to the card reader in response to which the card reader would send a show PIN command to the card. In response, the card would make available the PIN corresponding to the finger used in the successful verification process just performed.

From the above description, it will be noted that by arranging for the card to respond both to a show PIN command and an identify user command, it is possible to use the card for identification in situations in which the card reader with which the device is used does not require a PIN. In this case, illumination of the green LED 90 is a simple indication that the identity of the user has been verified.

Following each verification process, the encryption key derived from the unencrypted fingerprint template in partition 181 of flash memory 78 is discarded and not stored.

Remove User

In response to receiving a remove user command, the remove user module 126 is called into operation. This again carries out a similar fingerprint verification process and if this is successful the relevant data is removed from flash memory partition 180. The remove user module 126 may be arranged either to remove all data from the flash memory partition 180 and the register 190, and all prestored averaged fingerprint templates from the flash memory 78. Alternatively, it may be arranged so that it only removes a selected block or blocks of data from the flash memory partition 180 and register 190 and the corresponding prestored averaged fingerprint template or templates from the flash memory 78.

Modifications

Although, in the embodiment described with reference to and as illustrated in the drawings, the verification, encryption and decryption processes have all taken place on the device in the form of a card similar to a conventional credit card, the invention is also applicable to other forms of device or system. For example, the functionality described with reference to FIGS. 2 and 3 could be provided on some other type of device which incorporates a fingerprint reader, such as a computer or a mobile telecommunications device, for example a smart phone or tablet computer.

Further, although in the illustrated embodiment, the data register's stores 180, 181 and 190 have all been provided on the card itself, other arrangements are possible particularly if the verification device takes a form other than a card. For example, in a networked system, the unencrypted fingerprint templates which in the embodiment are stored in partition 181 could instead be stored on a central server and the processing for fingerprint verification and/or for encryption and decryption of data could be partly done at the central server utilising the unencrypted fingerprint templates stored thereat.

It should also be understood that the process of encrypting and decrypting data which has been described, in which unencrypted fingerprint template data is stored in a memory containing a substantial number of random data bytes or other data unrelated to the templates, and the unencrypted fingerprint template data is used for regeneration of an encryption or decryption key, may be used in any encryption and decryption system which utilises an encryption and/or decryption key derived from the fingerprint template.

Although conventionally a personal identity number consists only of numerical characters, it is possible for alphanumeric characters to be used for this.

Architectures for the card and its components which differ from that shown in the accompanying drawings are possible. For example, the digital signal processor and fingerprint scanner could be incorporated into a single integrated unit.

As previously explained, the invention has wide application. It may be used for a large number of different purposes, in particular in relation to a large number of different situations in which different types of electronic transaction will take place. Examples transactions and purposes for which the invention may be used are as follows:

POS/ATM Transactions
    Building Security
    Driver's License
    Airport ID/Access
    Hotel Room Access and Billing
    Hospital
    On line Gaming
    Downloaded entertainment
    Download Documents
    Credit Rating
    Birth Certificate
    Computer Access/Login
    Electronic Wallet
    Emergency Medical Information
    Other Licenses
    Government & Military Facility Access -continued Medical care
Membership Cards (clubs)
Loyalty Cards (airmiles)
Verification of Deliveries
Benefits Card
Parking Access
Passport
Port ID/Access
Proof of Insurance/Policy
Social Security Card
Visa or Entry/Exit of a border
Voter Registration Card
Food Stamp Card A separate enrolment process may take place in relation to each purpose for which the card is to be used.

In the following claims, the word "finger" is used to be generic to both fingers and thumbs.

The invention claimed is:

1. A smart card comprising:
   a fingerprint reader;
   a processor circuit configured to perform an encryption process in which an item of electronic information is encrypted and a decryption process in which the item of encrypted electronic information is decrypted; and
   a memory circuit storing the item of encrypted electronic information, wherein:
   (a) the processor circuit is configured to perform the encryption by:
      (i) deriving a first fingerprint template from a finger,
      (ii) storing the first fingerprint template in unencrypted form in the memory circuit which also contains other data values thereby to conceal the first fingerprint template,
      (iii) deriving an encryption key from the first fingerprint template,
      (iv) encrypting the first fingerprint template with the encryption key and storing the resulting encrypted first fingerprint template in the memory circuit in encrypted form; and
      (v) encrypting said information by an encryption algorithm which utilizes said encryption key, and
   (b) the processor circuit is further configured to perform the decryption by:
      (i) deriving a second fingerprint template from a finger,
      (ii) performing a matching process to match the second fingerprint template with the stored first fingerprint template,
      (iii) if the matching process is successful, regenerating the encryption key from the first fingerprint template,
      (iv) encrypting the first fingerprint template utilizing the regenerated encryption key and comparing the resulting encrypted fingerprint template with the stored first fingerprint template in encrypted form, and
      (v) decrypting the encrypted information utilizing the regenerated encryption key.

2. The smart card according to claim 1, in which said item of information comprises a personal identification number and the processor circuit is further configured to make said unencrypted personal identification number available for a personal identification number verification process following a successful said decryption operation.

3. The smart card according to claim 2, wherein the or each item of information includes further information additional to the personal identity number.

4. The smart card according to claim 1, which is operable to perform a plurality of said encryption processes each in relation to respective different item of electronic information and each utilizing a respective different finger, whereby each different item of electronic information may be encrypted and decrypted utilizing a respective different finger.

5. The smart card according to claim 4, wherein each said item of information comprises a personal identity number, and the processor circuit is further configured to make the respective decrypted personal identification number available for a personal identification number verification process following a successful decryption operation thereof.

6. The smart card according to claim 1, wherein said other data comprises random or pseudorandom numbers.

7. The smart card according to claim 1, wherein the or each first fingerprint template is broken up into a multiplicity of components which are stored in disparate locations in said memory circuit.

8. An electronic process for encrypting and decrypting information in electronic form, comprising:
   (i) deriving a first fingerprint template from a finger;
   (ii) storing the first fingerprint template in unencrypted form in a memory circuit which also contains other data values thereby to conceal the first fingerprint template;
   (iii) deriving an encryption key from the first fingerprint template;
   (iv) encrypting the first fingerprint template with the encryption key and storing the resulting encrypted first fingerprint template in the memory circuit in encrypted form;
   (v) encrypting said information by an encryption algorithm which utilizes said encryption key;
   (vi) storing said encrypted information in the memory circuit;
   (vii) deriving a second fingerprint template from a finger;
   (viii) performing a matching process to match the second fingerprint template with the stored first fingerprint template;
   (ix) if the matching process is successful, regenerating the encryption key from the first fingerprint template;
   (x) encrypting the first fingerprint template utilizing the regenerated encryption key and comparing the resulting encrypted fingerprint template with the stored first fingerprint template in encrypted form; and
   (xi) decrypting the encrypted information utilizing the regenerated encryption key.

9. The process of claim 8, wherein the other data comprises random or pseudorandom numbers.

10. The process of claim 8, wherein the first fingerprint template is broken up into components which are stored in disparate locations in the memory circuit.

11. A smart card comprising:
    a fingerprint reader;
    a processor circuit configured to perform an encryption process in which an item of electronic information is encrypted and a decryption process in which the item of encrypted electronic information is decrypted; and
    a memory circuit storing the item of encrypted electronic information, wherein:
    (a) the processor circuit is configured to perform the encryption by:
       (i) deriving a first fingerprint template from a finger,
       (ii) storing the first fingerprint template in unencrypted form in the memory circuit which also contains other data values thereby to conceal the first fingerprint template, the storing comprising breaking up the first fingerprint template into a multiplicity of components and storing the components in disparate locations in the memory circuit, (iii) deriving an encryption key from the first fingerprint template, and
(iv) encrypting the information by an encryption algorithm which utilizes the encryption key, and
(b) the processor circuit is further configured to perform the decryption by:
(i) deriving a second fingerprint template from a finger,
(ii) performing a matching process to match the second fingerprint template with the stored first fingerprint template,
(iii) if the matching process is successful, regenerating the encryption key from the first fingerprint template, and
(iv) decrypting the encrypted information utilizing the regenerated encryption key.

12. The smart card of claim 11, wherein the other data comprises random or pseudorandom numbers.

13. An electronic process for encrypting and decrypting information in electronic form, comprising:
deriving a first fingerprint template from a finger;
storing the first fingerprint template in unencrypted form in a memory circuit which also contains other data values thereby to conceal the first fingerprint template, the storing comprising breaking up the first fingerprint template into a multiplicity of components and storing the components in disparate locations in the memory circuit;
deriving an encryption key from the first fingerprint template;
encrypting said information by an encryption algorithm which utilizes said encryption key;
storing said encrypted information;
deriving a second fingerprint template from a finger;
performing a matching process to match the second fingerprint template with the stored first fingerprint template;
if the matching process is successful, regenerating the encryption key from the first fingerprint template; and
decrypting the encrypted information utilizing the regenerated encryption key.

14. The process of claim 13, wherein the other data comprises random or pseudorandom numbers.

15. A smart card comprising:
a fingerprint reader;
a processor circuit configured to perform an encryption process in which an item of electronic information is encrypted and a decryption process in which the item of encrypted electronic information is decrypted; and
a memory circuit storing the item of encrypted electronic information, wherein:
(a) the processor circuit is configured to perform the encryption by:
(i) deriving a first fingerprint template from a finger,
(ii) storing the first fingerprint template in unencrypted form in the memory circuit which also contains other data values thereby to conceal the first fingerprint template,
(iii) deriving an encryption key from the first fingerprint template, and
(iv) encrypting the information by an encryption algorithm which utilizes the encryption key, and
(b) the processor circuit is further configured to perform the decryption by:
(i) deriving a second fingerprint template from a finger,
(ii) performing a matching process to match the second fingerprint template with the stored first fingerprint template,
(iii) if the matching process is successful, regenerating the encryption key from only the first fingerprint template, and
(iv) decrypting the encrypted information utilizing the regenerated encryption key.

16. An electronic process for encrypting and decrypting information in electronic form, comprising:
deriving a first fingerprint template from a finger;
storing the first fingerprint template in unencrypted form in a memory circuit which also contains other data values thereby to conceal the first fingerprint template;
deriving an encryption key from the first fingerprint template;
encrypting said information by an encryption algorithm which utilizes said encryption key;
storing said encrypted information;
deriving a second fingerprint template from a finger;
performing a matching process to match the second fingerprint template with the stored first fingerprint template;
if the matching process is successful, regenerating the encryption key from only the first fingerprint template; and
decrypting the encrypted information utilizing the regenerated encryption key.

* * * * *